US006155532A

United States Patent [19]

Heinz et al.

[11] Patent Number: 6,155,532

[45] Date of Patent: Dec. 5, 2000

[54] VALVE FOR CONTROLLING FLUIDS

[75] Inventors: Rudolf Heinz, Renningen; Dieter Kienzler, Leonberg; Roger Potschin, Brackenheim; Klaus-Peter Schmoll, Lehrensteinsfeld; Friedrich Boecking, Stuttgart, all of Germany

[73] Assignee: Robert Bosch GmbH, Stuttgart, Germany

[21] Appl. No.: 09/165,634

[22] Filed: Oct. 2, 1998

[30] Foreign Application Priority Data

Oct. 2, 1997 [DE] Germany ........................... 197 43 640

[51] Int. Cl.[7] ................................................ F16K 31/122

[52] U.S. Cl. ........................................ 251/57; 251/129.06

[58] Field of Search .................................. 251/57, 129.06

[56] References Cited

U.S. PATENT DOCUMENTS

| | | | |
|---|---|---|---|
| 3,919,989 | 11/1975 | Jarrett et al. . | |
| 4,022,166 | 5/1977 | Bart ................................ | 251/129.06 X |
| 4,167,373 | 9/1979 | Jarrett et al. . | |
| 4,681,135 | 7/1987 | Tillman ................................ | 251/57 X |
| 4,728,074 | 3/1988 | Igashira et al. ........................... | 251/57 |
| 5,209,453 | 5/1993 | Aota et al. . | |
| 5,280,773 | 1/1994 | Henkel ........................... | 251/129.06 X |

FOREIGN PATENT DOCUMENTS

| | | | |
|---|---|---|---|
| 0 477 400 A1 | 9/1990 | European Pat. Off. . | |
| 0816670A1 | 1/1998 | European Pat. Off. . | |
| 670344 | 4/1952 | United Kingdom ..................... | 251/57 |

*Primary Examiner*—Stephen M. Hepperle
*Assistant Examiner*—John Bastianelli
*Attorney, Agent, or Firm*—Edwin E. Greigg; Ronald E. Greigg

[57] ABSTRACT

A valve for controlling fluids, which is provided with a fluid-filled coupling chamber that is disposed between an actuator piston of a piezoelectric actuator and a piston that actuates a valve member. In order to compensate for a leakage in the coupling chamber that is intermittently under high pressure during a switching procedure, a filling valve is provided that is disposed radially on the coupling chamber, but outside the chamber, and this valve monitors an inflow from an inlet conduit that is under ambient pressure in the valve. In this manner, on the one hand, the clearance volume produced by the attachment of the filling valve is very small and on the other hand, the filling valve is independent of the accelerated movements of the pistons, i.e., independent of their acceleration forces. The valve is designated for use in fuel injection devices for internal combustion engines of motor vehicles.

20 Claims, 3 Drawing Sheets

VALVE FOR CONTROLLING FLUIDS

BACKGROUND OF THE INVENTION

The invention relates to a valve for controlling liquids. A valve of this kind has been disclosed by EP 0 477 400. In it, the actuating piston of the valve member is disposed so that it can move in a sealed fashion in a smaller diameter part of a stepped bore, while a larger diameter piston, which is moved by means of the piezoelectric actuator, is disposed in a larger diameter part of the stepped bore. A hydraulic coupling chamber is mounted between the two pistons in such a way that when the larger piston is moved a particular distance by means of the piezoelectric actuator, the actuating piston of the valve member is moved for a distance that is enlarged by the translation ratio of the stepped bore diameter. The valve member, the actuating piston, the larger diameter actuator piston, and the piezoelectric actuator are disposed in series on a common axis.

With valves of this kind, there is the problem of compensating for length changes in the piezoelectric actuator, the valve, or the valve housing by means of the hydraulic coupling chamber. Since the piezoelectric actuator generates a pressure in the coupling chamber to open the valve, this pressure also leads to a loss of coupling chamber fluid. In order to prevent an evacuation of the coupling chamber, a refilling is necessary. A device that is intended to produce this kind of refilling has in fact already been disclosed by the prior art mentioned at the beginning, but this has the disadvantage that a continuous connection that is open in both possible flow directions is provided between the coupling chamber and a reservoir, which significantly influences the operational behavior of the piezoelectric actuator. In particular, a consequently enlarged volume leads to a compressibility that reduces the transmission rigidity of the hydraulic column formed by the coupling chamber.

OBJECT AND SUMMARY OF THE INVENTION

The valve according to the invention has the advantage over the prior art that the coupling chamber always remains sufficiently filled and coupling fluid can only flow in the direction of a coupling chamber. A disadvantageous length change of the entire device is thus prevented. This also applies if the piezoelectric actuator, the valve, or the housing should change in length, e.g. upon heating, because a length change of this kind in the coupling chamber is compensated for by means of leaks. It is furthermore advantageous that the device has a simple design and functions in a safe and reliable manner.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
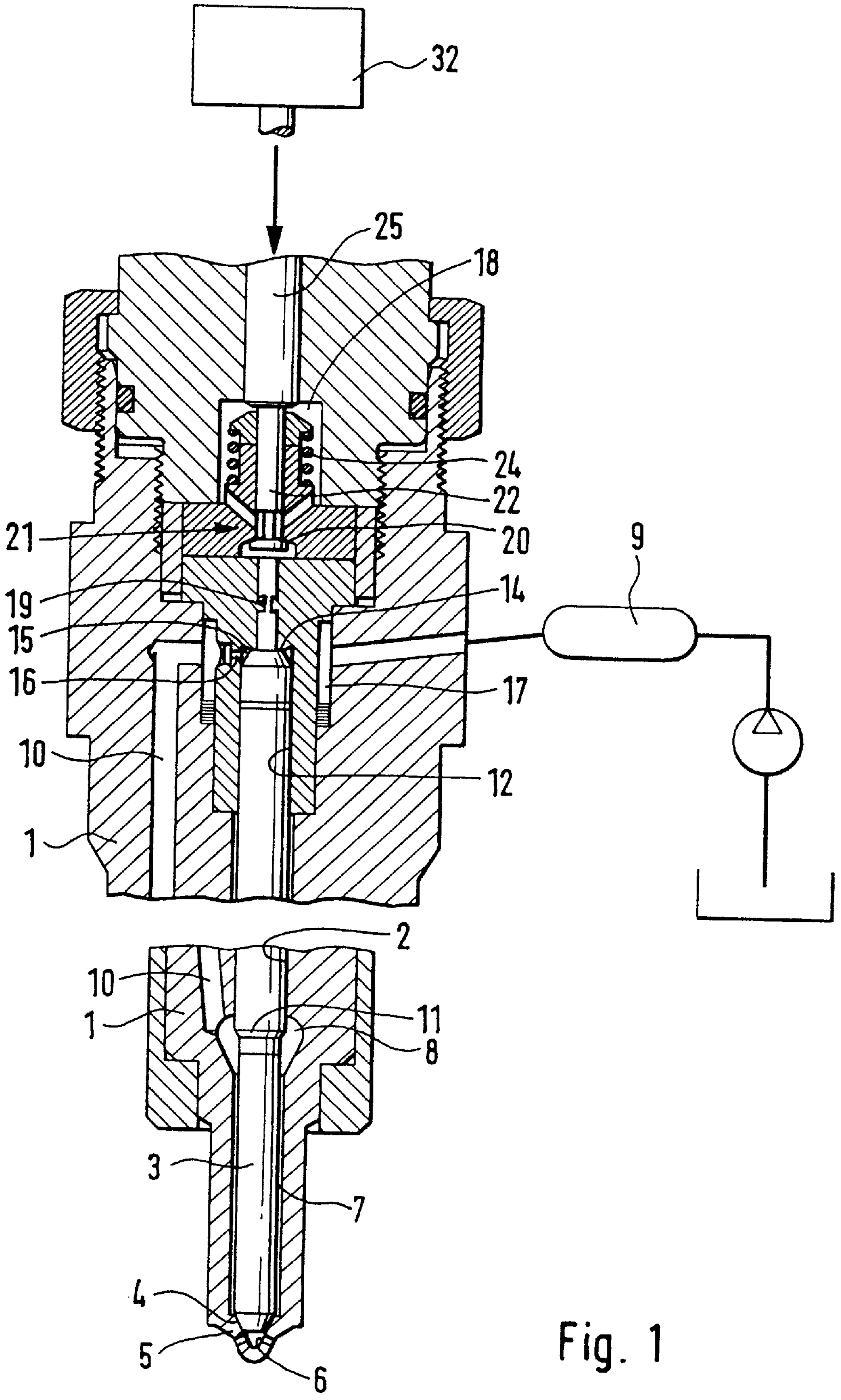
FIG. 1 is a section through a fuel injection valve.

The valve according to the invention is used in a fuel injection valve whose essential parts are shown in the sectional view in FIG. 1. This injection valve has a valve housing 1 in which a valve needle 3 is guided in a longitudinal bore 2, which valve needle can be pre-loaded in the closing direction by means of a closing spring in a known manner not shown in detail here. On its one end, the valve needle is provided with a conical sealing face 4, that cooperates with a seat 6 at the tip 5 of the valve housing protruding into the combustion chamber, from which seat injection openings lead, that connect the interior of the injection valve, here the annular chamber 7 that encompasses the valve needle 3 and is filled with fuel under injection pressure, to the combustion chamber in order to thus carry out an injection when the valve needle has lifted up from its seat. The annular chamber is connected to another pressure chamber 8, which continuously communicates with a pressure line 10, by way of which the fuel injection valve is supplied with fuel under injection pressure from a high pressure fuel chamber 9. This high fuel pressure also prevails in the pressure chamber 8, and acts on a pressure shoulder 11 there, by way of which the nozzle needle can be lifted up from its valve seat in a known manner under suitable conditions.

On the other end of the valve needle, the valve needle is guided in a cylinder bore 12 and with its end face 14, encloses a control pressure chamber 15 there, which continuously communicates by way of a throttle connection 16 with an annular chamber 17, which like the pressure chamber 8, continuously communicates with the high pressure fuel chamber. Axially, a throttle bore 19 leads from the control pressure chamber 15 to a valve seat 20 of a control valve 21. The valve seat cooperates with a valve member 22 of the control valve, and in the lifted state, this valve member produces a connection between the control pressure chamber 15 and a spring chamber 18, which, in turn, continuously communicates with a relief chamber. A compression spring 24 that loads the valve member 22 in the closing direction is disposed in the spring chamber 18 and acts on the valve member 22 in the direction of the valve seat 20 so that in the normal position of the control valve, this connection of the control pressure chamber 15 is closed. Since the end face area of the valve needle 3 in the region of the control pressure chamber is greater than the area of the pressure shoulder 11, the same fuel pressure in the control pressure chamber that also prevails in the pressure chamber 8 now holds the valve needle 3 in the closed position. If the valve member 22 is lifted, though, the pressure in the control pressure chamber 15, which is de-coupled by way of the throttle connection 16, is relieved. With the now absent or reduced closing force, the valve needle 3 rapidly opens, if need be, counter to the force of a closing spring and on the other hand, can be brought into the closed position as soon as the valve member 22 comes back into the closed position since from this time on, the original high fuel pressure in the control pressure chamber 15 builds up again rapidly by way of the throttle connection 16.

Figure 2:
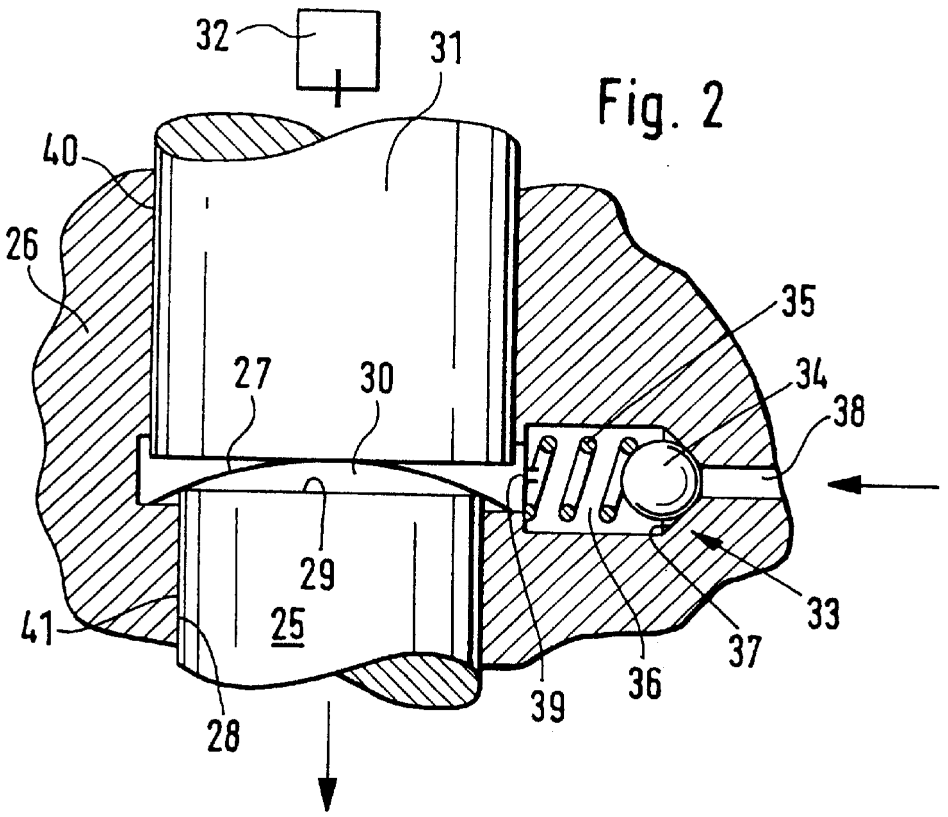
FIG. 2 shows a first exemplary embodiment of a filling valve.

The control valve according to the invention has a piston 25 designed for actuating the control valve, which acts on the valve member 22 and can be actuated by means of a piezoelectric actuator 32 that is shown in more detail in FIG. 2. The piston 25 is guided in a sealed fashion in a guide bore 28 and defines with its end face 29 a coupling chamber 30, which, on its opposite wall, is closed off by a larger diameter actuator piston 31, which is part of the piezoelectric actuator 32 and is held in contact with the piezoelectric actuator 32 by means of a flat spring 27 disposed in the coupling chamber 30. Both of the pistons 25 and 31 are guided in their bores in a sealed fashion. Due to the different piston areas of the two pistons 25 and 31, the coupling chamber 30 functions as a translation chamber by virtue of the fact that the coupling chamber translates a structurally conditional small stroke of the piezoelectric actuator piston 31 into a larger stroke of the piston 25 that actuates the control valve 21. Upon excitation of the piezoelectric actuator, the piston 25 is adjusted so that the valve member 22 is lifted up from its seat 20. This results in a relief of the control pressure chamber, which in turn brings about the opening of the valve needle 3. With the functioning of the valve and with the pressure translation, very high pressures occur in the coupling chamber 30. In order to prevent a filling loss due to leakage along the piston guide, despite this loading of the enclosed hydraulic fluid, and in order to compensate for fill level losses by means of a volume change in the event of temperature changes, a filling valve 33 is provided that is connected to the coupling chamber 30.

Figure 3:
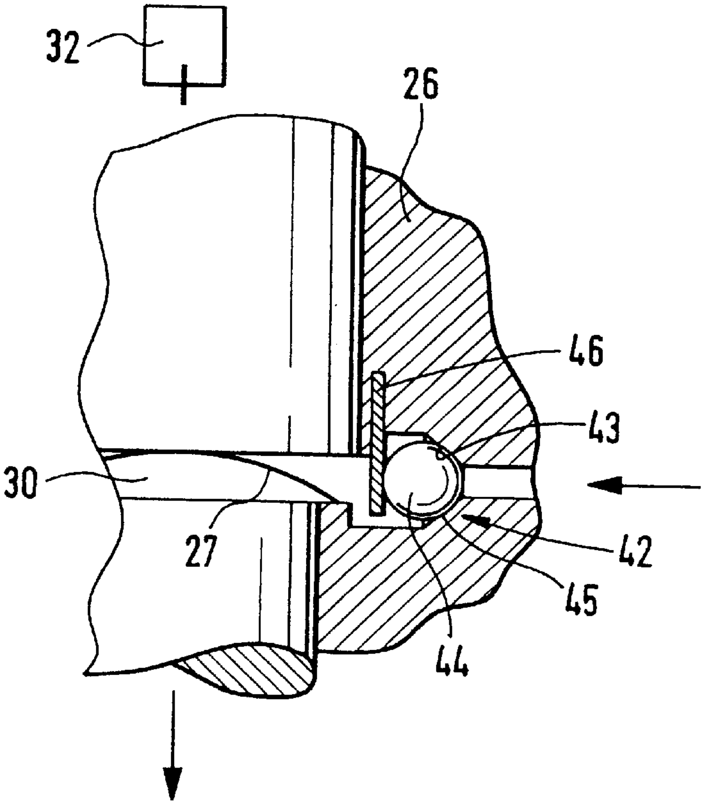
FIG. 3 shows a second exemplary embodiment of a filling valve.
Figure 4:
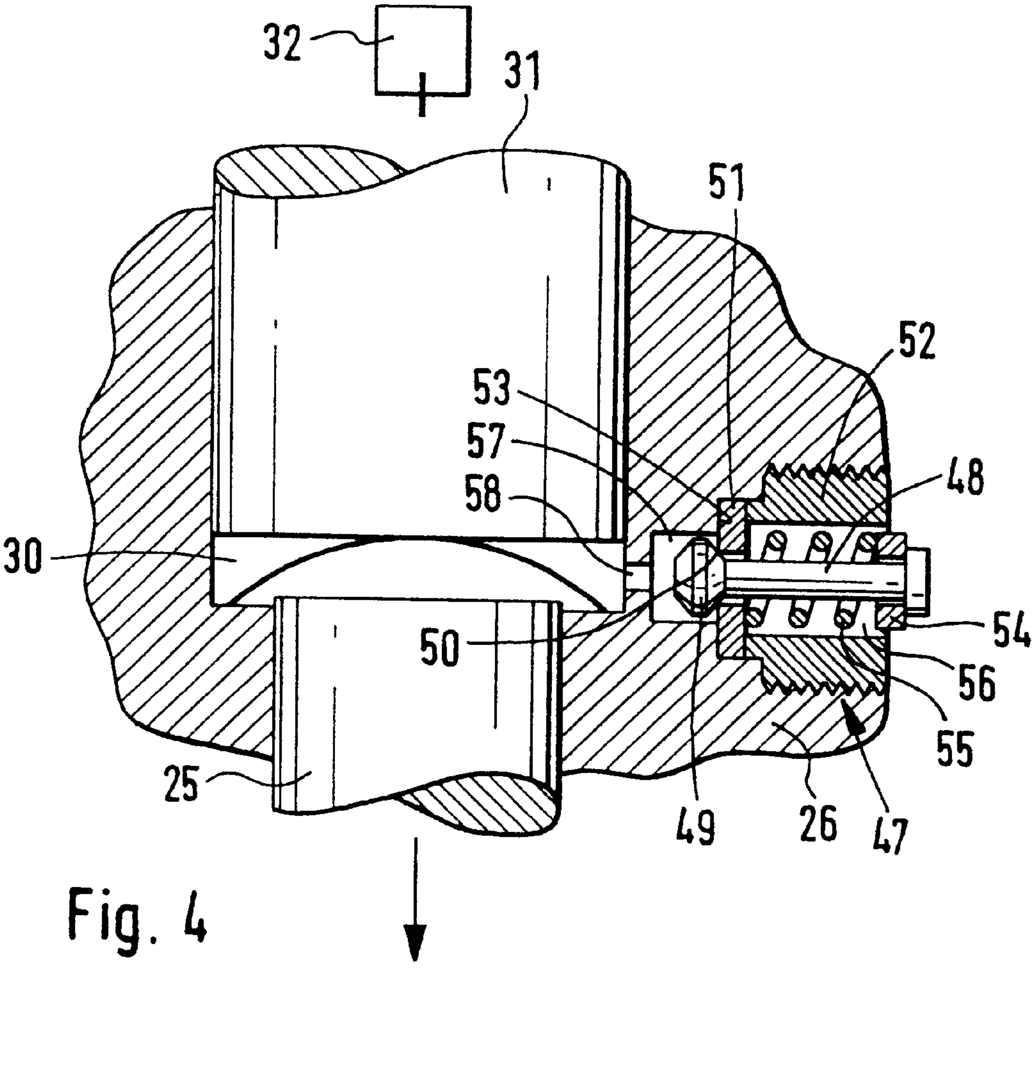
FIG. 4 shows a third exemplary embodiment of a filling valve.

According to the invention, in the exemplary embodiments according to FIGS. 2, 3, and 4, a filling valve of this kind is placed so that it is built directly onto the coupling chamber 30 radially in order to keep the clearance volume in the coupling chamber 30 as small as possible and to keep the rigidity of the transfer volume for the adjusting movement as large as possible.

In FIG. 2, a filling valve 33 is shown, which has a ball-shaped closing member 34 that is directly loaded by a helical compression valve spring 35. The closing member 34 and valve spring 35 are disposed in a valve chamber 36. The valve spring 35 presses the closing member 34 against a valve seat 37 that is provided in the housing 26. An inlet conduit 38 that is under low pressure feeds centrally into the valve seat 37. A connecting bore 39 is provided in a cylinder wall of the spring-equipped coupling chamber 30, and the filling valve 33 communicates with the coupling chamber 30 by way of this bore 39. Both the actuator piston 31 and the piston 25 are guided in a sealed fashion in the housing 26; nevertheless, a leakage occurs in the guides 40 and 41, respectively, in both pistons due to the high pressure in the coupling chamber 30.

If, during the operation of the valve, fluid from the coupling chamber 30 is lost by way of the guides 40 and 41, i.e. the volume of the coupling chamber 30 is reduced, the filling valve 33 immediately compensates for this loss by virtue of the fact that there is a replenishing flow of fluid from the inlet conduit 38 by way of the valve chamber 36 and the valve member 34 that is lifting up from its valve seat 37. This is supported by the flat spring 57, which attempts to keep the coupling chamber 30 as large as possible, by virtue of the fact that it moves the piston 31 toward the piezo-electric actuator 32. The inlet pressure, the valve seat 37, and the valve spring 35 must be matched to one another. In this embodiment, the filling valve (33) is independent of the accelerated movements of the pistons (25, 31), i.e., independent of their acceleration forces.

It is important that the volume of the coupling chamber 30 is not significantly enlarged by means of the valve chamber 36. A filling valve 42 that is shown in FIG. 3 is optimized even further in this regard. This construction renders the valve chamber 36 of the type according to FIG. 2 unnecessary.

A valve seat 43 for a ball-shaped closing member 44 of the filling valve 42 is radially let into a wall 45 of the likewise spring-equipped coupling chamber 30. In this instance, a spring-membrane, which protrudes edgewise into the coupling chamber 30 and is anchored in the housing 26, acts as the valve spring 46.

Another optimized type of filling valve 47 is shown in FIG. 4. In this instance, the filling valve 47 is provided with a tie rod 48, which, with a head-shaped closing member 49 comes near to the coupling chamber 30. A valve seat 50 is disposed on a disk 51, which is fixed to a housing shoulder 53 by a hollow adjusting nut 52.

A spring plate 54 is disposed so that it can be screwed onto the tie rod 48 and a valve spring 55 rests on it, which attempts to hold the closing member 49 against its valve seat 50. The adjusting nut 52 is screwed into the housing 26 and is embodied as annular and cylindrical in order to contain the tie rod 48 and the valve spring 55 in its hollow cylinder 56. A valve chamber 57 containing the closing member 49 communicates directly with the coupling chamber 30 by way of a radial opening 58.

It should be clear that with this design, the clearance volume produced by means of the attachment of the filling valve 47 is likewise very small.

The foregoing relates to preferred exemplary embodiments of the invention, it being understood that other variants and embodiments thereof are possible within the spirit and scope of the invention, the latter being defined by the appended claims.

We claim:

1. A valve for controlling fluids, comprising a housing (26) a valve member (22) in said housing which includes a piston (25) that is acted on by a restoring force and is designated for actuating said valve member (22), said piston, with a first end face as a movable wall, encloses a hydraulic coupling chamber (30) that is defined on another side by a second end face of an actuator piston (31) of a piezoelectric actuator (32), a flat spring (27) disposed within said coupling chamber between said first end face of said piston and said second end face of said actuator piston, said actuator piston (31) has an operating stroke against said flat spring (27) that generates a pressure increase in the coupling chamber (30), by means of which the piston (25) is moved counter to a restoring force, the coupling chamber (30) is connected to a fluid source by way of a filling valve (33, 42, 47) that opens in a direction of the coupling chamber and said flat spring (27) holds said actuator piston in contact with said piezoelectric actuator.

2. A valve according to claim 1, in which the filling valve (33, 42, 47) is built directly onto the coupling chamber (30) radially and is embodied as a check valve.

3. A valve according to claim 1, in which a closing member (34, 44) of the filling valve (33, 42) is loaded directly by a valve spring (35, 46) that presses the closing member (34, 44) against a valve seat (37, 43), which is provided in the housing (26).

4. A valve according to claim 2, in which a closing member (34, 44) of the filling valve (33, 42) is loaded directly by a valve spring (35, 46) that presses the closing member (34, 44) against a valve seat (37, 43), which is provided in the housing (26).

5. A valve according to claim 3, in which the valve spring (35) is a helical compression spring.

6. A valve according to claim 4, in which the valve spring (35) is a helical compression spring.

7. A valve according to claim 3, in which the valve spring (46) is a spring membrane.

8. A valve according to claim 4, in which the valve spring (46) is a spring membrane.

9. A valve according to claim 1, in which the closing member (34, 44) is embodied as a ball.

10. A valve according to claim 2, in which the closing member (34, 44) is embodied as a ball.

11. A valve according to claim 3, in which the closing member (34, 44) is embodied as a ball.

12. A valve according to claim 5, in which the closing member (34, 44) is embodied as a ball.

13. A valve according to claim 7, in which the closing member (34, 44) is embodied as a ball.

14. A valve according to claim 1, in which the filling valve (47) has a tie rod (48) which is engaged by a valve spring (55) that attempts to pull a closing member (49), which is attached to the tie rod (48), against a valve seat (50).

15. A valve according to claim 2, in which the filling valve (47) has a tie rod (48) which is engaged by a valve spring (55) that attempts to pull a closing member (49), which is attached to the tie rod (48), against a valve seat (50).

16. A valve according to claim 14, in which the valve seat (50) is disposed on a disk (51) that is fixed to a housing shoulder (53) by a hollow adjusting nut (52).

17. A valve according to claim 16, in which the adjusting nut (52) is screwed into the housing (26), is embodied as annular and cylindrical, and contains the tie rod (48) and the valve spring (55) in its hollow cylinder (56).

18. A valve according to claim 14, in which the initial tension of the valve spring (55) can be changed by means of a spring plate (54) that can be screwed onto the tie rod (48).

19. A valve according to claim 16, in which the initial tension of the valve spring (55) can be changed by means of a spring plate (54) that can be screwed onto the tie rod (48).

20. A valve according to claim 17, in which the initial tension of the valve spring (55) can be changed by means of a spring plate (54) that can be screwed onto the tie rod (48).

* * * * *